June 25, 1929.   D. C. DAVIS   1,718,336
GOVERNOR
Filed Feb. 26, 1926   2 Sheets-Sheet 1

WITNESSES:

D. C. Davis
INVENTOR

BY
A. B. Reavis
ATTORNEY

Patented June 25, 1929.

1,718,336

UNITED STATES PATENT OFFICE.

DAVID C. DAVIS, OF MONTCLAIR, NEW JERSEY, ASSIGNOR TO WESTINGHOUSE ELECTRIC & MANUFACTURING COMPANY, A CORPORATION OF PENNSYLVANIA.

GOVERNOR.

Application filed February 26, 1926. Serial No. 90,845.

My invention relates to governing apparatus for prime movers, more particularly for elastic fluid operated prime movers, such, for example, as elastic fluid turbines driving electric generators, and has for its object the provision of apparatus of the character designated which shall be capable of maintaining predetermined speed range of the prime mover while at the same time responding to slight changes in load thereon.

A further object of my invention is to provide governing apparatus for an elastic fluid turbine wherein the minimum volume of elastic fluid shall be wire-drawn in effecting governing movements and the prime mover shall still be able to take care of the maximum of load with a minimum of speed variation.

A still further object of my invention is to provide a governing apparatus for a prime mover driving an electric generator wherein variations in speed are governed by speed responsive mechanism and wherein variations in load on the generator are taken care of by governing apparatus responsive solely to the electric load on the generator.

Figure 1:
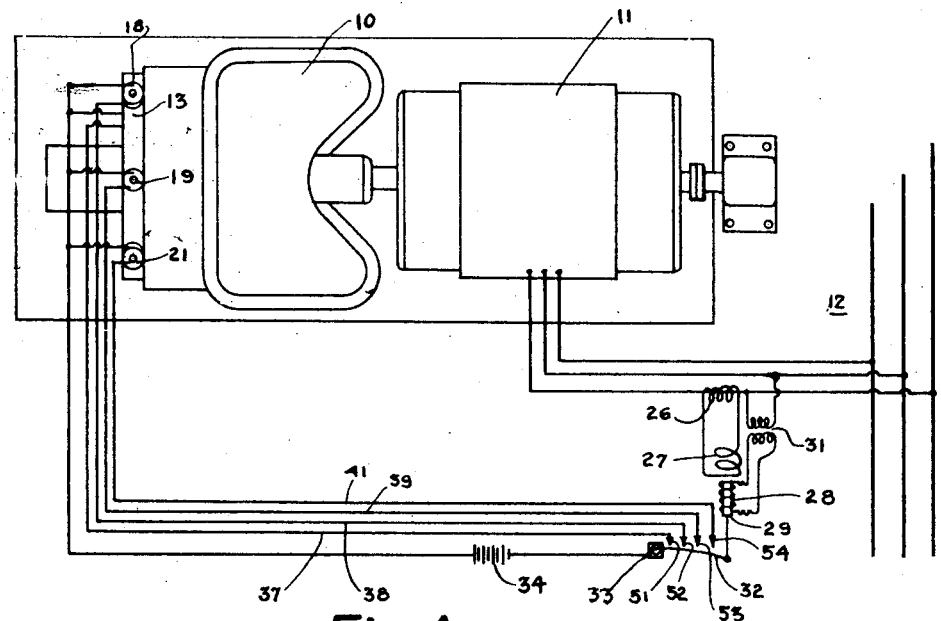
Figure 2:
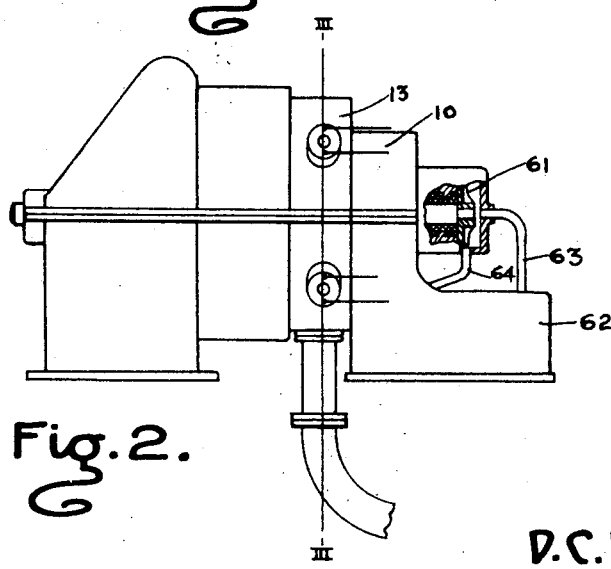
Figure 3:
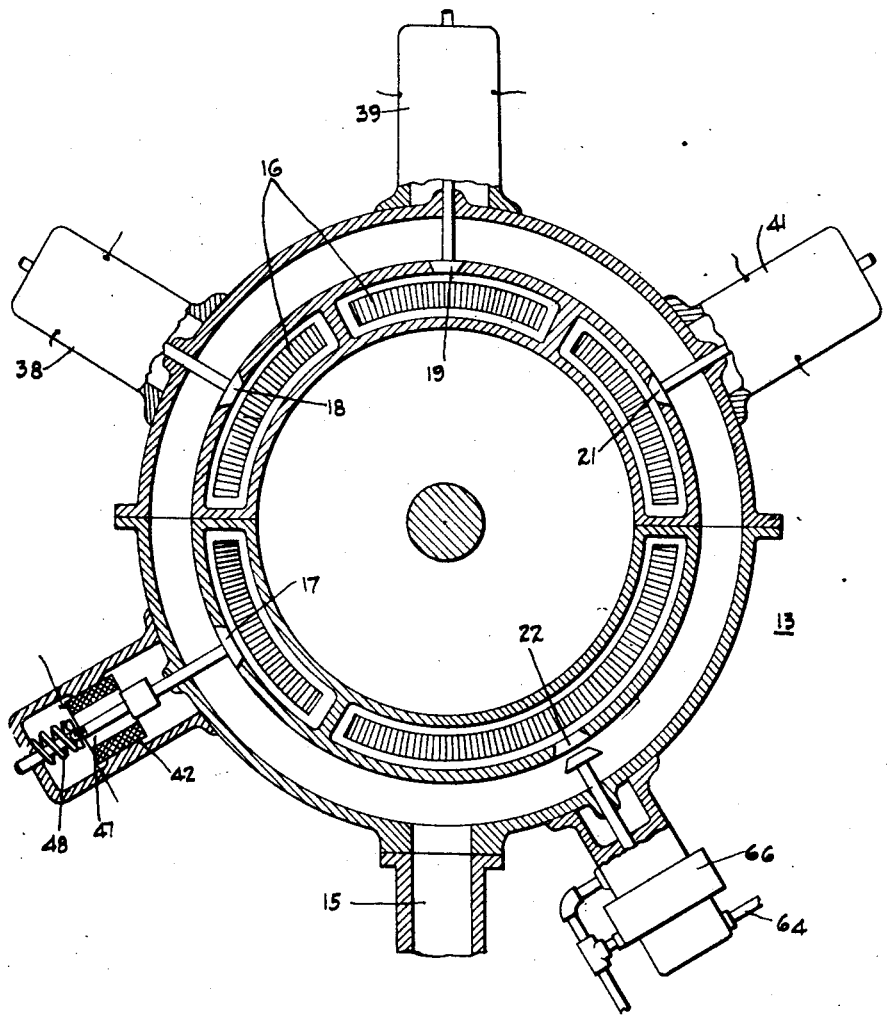

These and other objects which will become apparent throughout this specification are obtained by apparatus embodying features of my invention and illustrated in the accompanying drawings forming a part of this specification, wherein Fig. 1 is a plan view of an elastic fluid turbine and an electric generator driven thereby, the turbine being governed in accordance with my invention; Fig. 2 is a side elevation of the turbine; and Fig. 3 is a sectional view taken along the line III—III of Fig. 2.

Heretofore, in the governing of elastic fluid turbines, it has been customary to admit motive fluid through one or more admission valves, and to control the admission valves by means responsive to the speed of the turbine. In such apparatus, as the speed increases, the admission valves are moved more and more in a closing direction, resulting in a wire-drawing of the elastic motive fluid and a consequent reduction in its pressure. This action causes a loss of energy in the fluid without its doing any useful work. Again, in such apparatus, the speed of the turbine depends upon its load and, upon a change in load, the speed must either increase or decrease in response thereto before the governor can take up a new position responsive to the change in speed. This action entails a lag between changes in load and operation of the governor. In order to overcome this difficulty, it has been proposed to incorporate in the governor a device responsive to changes in load of the driven machine for modifying the action of the speed responsive governor. There still remains, however, with this construction, the undesired throttling or wire-drawing of the elastic motive fluid and its consequent loss of energy.

In accordance with my invention, I overcome the before mentioned difficulties by providing a plurality of admission valves for the turbine and operate certain of the admission valves by means responsive to the speed of the turbine and the remainder by means responsive to the load on the generator, independently of the speed responsive means. Preferably, only one valve or a sufficient number to insure close control of the turbine upon slight changes in speed is operated by the speed responsive means, while the major portion of the governing is accomplished by electrically operated admission valves responsive solely to changes in load on the generator. The valves operated by the means responsive to the load on the generator are normally closed and come into play instantaneously and consecutively as the load is increased on the turbine and are closed instantaneously and consecutively as the load is decreased on the turbine.

Referring now to the drawings for a better understanding of my invention, I show in Fig. 1 at 10 an elastic fluid turbine driving an electric generator, 11, which feeds into a bus line, 12. The turbine 10 is provided with a steam chest 13, (Fig. 3), which communicates with a plurality of nozzle chambers 16—16 for expanding and directing motive fluid into the turbine in a manner well known in the art. Motive fluid is admitted to the nozzle chambers 16—16 from a conduit 15 by a corresponding number of motive fluid admission valves. In the drawing, I show five admission valves, 17, 18, 19, 21 and 22. The admission valves 17 to 21 are normally closed and are controlled by means responsive to the electric load on the generator 11, to be described later, and the valve 22 is normally open and is controlled by means responsive to the speed of the turbine. Referring again to Fig. 1, I show a wattmeter device responsive to the load on the electric generator comprising a current transformer 26, a fixed current coil 27, and a moving voltage coil 28, said coil being provided with a core element 29 therein. Where extra high voltages are employed, a voltage transformer, 31, may also be introduced. The movable element 28—29 is operatively connected to a resilient curved lever 32, which is pivoted at a stationary point, 33. At 34 I show a source of electrical energy, for example a battery, with a circuit leading therefrom and electrically connected to the lever 32. At 37, 38, 39 and 41, are indicated separate electrical circuits leading to operating devices for the motive fluid admission valves 17, 18, 19 and 21, respectively. The operating devices of the valves 17, 18, 19 and 21 embody solenoids such as shown at 42 in Fig. 3, each having a movable element as at 47, which is biased inwardly so as to move its corresponding valve in a closing direction by a spring 48. The circuits 37, 38, 39 and 41 terminate in contact members 51, 52, 53 and 54 lying adjacent the lever 32. Upon an increase in load on the electric generator, the movable element 28—29 pulls the lever 32 inwardly, and the contact members 51, 52, 53, and 54 are closed successively by said lever according to the extent of movement of the wattmeter device. It is understood in this connection that the movable element 28—29 has a definite position for whatever load is upon the generator. In the event there is no load, the movable element 28—29 is at its extreme lower position with all of the control circuits open and all of the electrically operated valves closed. Upon an increase in load, the circuit 37 is first closed and the valve 17 is opened to take care of the increased load. Upon a further increase in load, the circuit 38 is closed and the valve 18 is opened and so on. Upon a decrease in load, the circuits are opened and the valves are closed by the springs 48—48 in the reverse order to their opening.

Referring now to Fig. 2, I show a pump 61 for developing fluid under pressure varying with the speed turbine 10, said pump being supplied with fluid from a reservoir 62 through a conduit 63 and delivering fluid through a conduit 64 to a fluid pressure operated governor 66, Fig. 3. The fluid pressure operated governor 66 is preferably one such as is described in the patent to John S. Meyers, No. 1,633,888 and assigned to Westinghouse Elec. & Mfg. Co., and will not be described here in detail. The governor, 66, is employed to control the admission valve 22 in response to the speed of the turbine 10, it being understood that upon increases in fluid pressure it moves the valve in a closing direction and upon decreases in fluid pressure it moves the valve in an opening direction. The admission valve 22 is normally open and is designed to control the admission of elastic motive fluid to the turbine upon changes in speed thereof. Thus when the turbine is being started, fluid is first admitted to the nozzle chamber controlled by the admission valve 22 and the governor 66 maintains the speed of the turbine at its desired value. As the load on the generator increases, one or more of the electrically operated valves is opened and, should there be an increase in speed upon the opening of one of the electrically operated admission valves, the speed responsive governor 66 moves the admission valve 22 in a closing direction to compensate for the increase in speed.

In the arrangement shown, which is typical of one capable of a 50% over-load, I have shown the admission valve 22 as controlling one-third of the nozzles of the turbine, and thus adapted to control the turbine when operating at approximately 50% of normal load. Each of the electrically operated valves, 17, 18, 19 and 21 are shown as controlling one sixth of the turbine nozzles, thus allowing for a graduated admission of motive fluid to the turbine up to 150% of normal load. It will be apparent, however, that the arrangement shown is for the purpose of illustration only, and that the arrangement of the valves and the nozzles controlled thereby, may be widely varied within the scope of my invention.

From the foregoing description, the operation of apparatus made in accordance with my invention will be apparent. Motive fluid is admitted to the steam chest 13 through the conduit, 15, and through the admission valve 22 to its associated group of nozzles in starting the turbine. So long as the load on the turbine does not exceed 50% of its normal value, the admission valves, 17, 18, 19 and 21, remain closed and the admission of motive fluid to the turbine is controlled entirely by the speed responsive governor 66. Upon an increase in load on the generator, the movable element 28—29 of the device responsive to the load on the generator 11 moves inwardly and first closes the circuit, 37, and effects the opening of the admission valve 17 to its associated group of nozzles. Should there be an increase in speed upon the opening of the valve 17 above that determined by the setting of the speed responsive governor 66, said governor effects a closing movement of the valve 22 in response thereto. As the load on the generator further increases, the lever is moved further inwardly, closing in succession the circuits 38, 39 and 41, until all possible power is being developed by the turbine. Should the generator 11 suddenly drop its load the lever 32 is moved instantly outward in response thereto, and opens all the electrical circuits 37, 38, 39 and 41, effecting a closing of the electrically controlled admission valves, 17, 18, 19 and 21. The control of the speed of the turbine is still with the speed responsive governor, 66, so that danger of over-speeding thereof is greatly minimized. In other words, the electrically operated valves carry the base load and ordinary small variations are carried by the governor operated valve. This governor valve is accordingly much smaller than it would be if it controlled the entire steam supply and in consequence is lighter and more quickly responsive than would be the control valve for the same turbine if of ordinary design.

From the foregoing, it will be apparent that I have devised an improved governing apparatus for a prime mover, embodying means responsive to the speed thereof and independently operated means responsive to the load or work done by the prime mover.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a governing system for a prime mover carrying a varying load, a primary valve adapted to control the admission of motive fluid to the prime mover through a predetermined speed range, speed responsive means for controlling the primary valve, a plurality of other valves for admitting motive fluid to the prime mover, and means responsive to variations in the load on the prime mover for sequentially operating said other valves independently of the speed responsive means.

2. The combination with an elastic fluid turbine and an electric generator driven thereby, of a steam chest for the turbine comprising a plurality of nozzle groups with each group controlled by a separate motive fluid admission valve, means responsive to the speed of the turbine for controlling one of the valves, separate electromagnetic means for operating the other valves, separate controlling electric circuits leading to each of the electromagnetic means, means movable in response to the electric load on the generator, and means actuated by said last mentioned means for successively opening and closing the circuits.

3. A governing system for an elastic fluid turbine driving an electric generator comprising a nozzle chamber divided into individual groups of nozzles, a normally open admission valve for at least one group of nozzles, separate normally closed admission valves for the other groups of nozzles, means responsive to the speed of the turbine for moving the normally open admission valves in a closing direction, and means responsive to the electric load on the generator for opening the other admission valves.

4. The combination with an elastic fluid turbine and an electric generator driven thereby, of a plurality of motive fluid admission valves for the turbine, means responsive to the speed of the turbine for controlling one of the valves, separate means for operating each one of a plurality of the other valves, means movable in response to variations in the electric load on the generator and controlling the valve operating means to successively open and close the last-mentioned valves.

5. The combination with a prime mover and a variably-loaded machine driven thereby, of a plurality of motive fluid admission valves for the prime mover, means responsive to the speed of the prime mover for controlling one of the valves, and means responsive to variations in load on the driven machine for successively operating a plurality of other valves, said last-named means moving each valve the full length of its travel when operating the same.

In testimony whereof, I have hereunto subscribed my name this 11th day of Feb., 1926.

DAVID C. DAVIS.